RE 25785

United States Patent Office 3,001,913
Patented Sept. 26, 1961

3,001,913
PROCESS FOR PREPARING A NUCLEIC ACID
Roland F. Beers, Jr., 4309 Wendover Road,
Baltimore, Md.
No Drawing. Filed Mar. 20, 1958, Ser. No. 722,627
2 Claims. (Cl. 195—29)

This invention relates to an improved process for the separation of deoxyribonucleic acid (DNA) from mixtures containing deoxyribonucleic acid and ribonucleic acid (RNA). Particularly, the invention relates to a process for the separation of deoxyribonucleic acid from mixtures containing both ribonucleic acid and deoxyribonucleic acid which comprises the selective destruction of ribonucleic acid by phosphorylysis and separating the deoxyribonucleic acid from the mixture.

It has been found that mixtures of ribonucleic acid and deoxyribonucleic acid may be resolved to obtain highly purified deoxyribonucleic acid by a process which involves selective destruction of ribonucleic acid by the enzyme polynucleotide phosphorylase (polyase), in the presence of orthophosphate ions at a pH within the range of 7.5 to 9. Briefly, this new and improved process comprises the steps of contacting a mixture of ribonucleic acid and deoxyribonucleic acid with a source of orthophosphate and polyase for the desired period of time, thereafter adding a salt solution to protect the deoxyribonucleic acid from damage and to facilitate the subsequent separation of deoxyribonucleic acid from protein, heating the mixture to a temperature of about 85 to 95° for about 20 to 30 minutes, and separating and recovering the deoxyribonucleic acid from the ribonucleic acid and other impurities.

The key to the operability of the instant process is the use of orthophosphate ions in the presence of polyase. This combination, which is essential in the process, splits the polymer of ribonucleic acid into small fragments which may be readily separated from the deoxyribonucleic acid which is not attacked by the combination. In the absence of orthophosphate there is little destruction of ribonucleic acid except under conditions which also extensively destroy the deoxyribonucleic acid. Except at the proper pH range polyase is inactive. Also of particular importance are (1) the necessity of carrying out the process with ribonucleic acid which has not been degraded or substantially altered from its native form; (2) the heating step during which the destruction of ribonucleic acid is rendered more complete and the separation of deoxyribonucleic acid from other impurities, such as proteins, is facilitated; and (3) the separation of deoxyribonucleic acid from ribonucleic acid fragments by fractional precipitation with ethanol or acetone at a proper salt concentration.

The inventive process is more specifically described as follows: (In this illustration the destruction of ribonucleic acid is carried out in the bacterial cells undergoing concurrent lysis, thereby preventing any substantial degradation of ribonucleic acid into a form which cannot be attacked by the polyase-orthophosphate system. The cells contain the necessary amount of polyase for carrying out the process.)

Cells of *Micrococcus lysodeikticus* are suspended in a solution of sodium chloride and the pH of the solution is adjusted to approximately pH 8.5. Lysozyme is added to the suspension along with the desired amount of a salt of orthophosphoric acid. The mixture is incubated for from 30 minutes to 1 hour at a temperature within the range of 30 to 40° C. in order for the action of the polyase-orthophosphate system to take place on the ribonucleic acid.

After this incubation time additional salt solution is added and the volume of the mixture increased to facilitate the separation of the highly viscous deoxyribonucleic acid from the subsequently formed insoluble matter. The mixture is then heated for from 15 to 30 minutes at a temperature within the range of 85 to 95° C. The heating should be as brief as possible, consistent with the volume of material and source and rate of heating. A flow system can be used in which the mixture is passed through coils immersed in boiling water and ice water at a rate sufficient to render the major fraction of the proteins insoluble by the heating.

After the incubation and heating steps, during which time a major fraction of the proteins are rendered insoluble and the ribonucleic acid is degraded into small fragments, the mixture is cooled to room temperature, and the solids separated by centrifugation. The supernatant is mixed with an equal volume of an organic solvent to precipitate the deoxyribonucleic acid as a fibrous mass, which is removed from the liquid, dissolved in a similar salt solution and shaken several times with successive portions of chloroform accompanied by denaturation of the protein and removal of this impurity as a gel suspension. The ribonucleic acid fragments are removed with the protein. The protein-free deoxyribonucleic acid solution is mixed with an equal volume of organic solvent to reprecipitate the deoxyribonucleic acid, which is redissolved in a 2% salt solution, reprecipitated with the organic solvent, etc., the cycle being repeated three times or until all the inorganic orthophosphate has been removed by this procedure. The same procedure also removes the last residual ribonucleic acid which has not been removed by the deproteination step. After the final precipitation the white fibrous deoxyribonucleic acid is washed with ethanol, acetone and/or ether and dried in vacuo.

In its preferred form the invention contemplates the phosphorylysis of the ribonucleic acid within the *Micrococcus lysodeikticus* cells by the endogenous polyase and orthophosphate. This phosphorylysis may be carried out at a pH range of 7.5 to 9. However, it is preferred to use a pH within the range of 8.3 and 8.7, and a pH of 8.5 is especially preferred. This corresponds to the maximum activity of the enzyme.

The lysozyme used in the lysing step is not critical. Crystalline lysozyme or dried egg white may be used.

The phosphorylysis step is carried out in the presence of a salt of orthophosphoric acid. Any of the following salts or acid may be used: $M_3PO_4$, $M_2HPO_4$, $MH_2PO_4$, where M is an alkali or alkaline earth metal. The process is applicable to any bacteriological material which contains sufficient endogenous polyase, sufficient deoxyribonucleic acid to make the process practical, and which can be fragmented by any of several well known methods which do not cause extensive damage to the endogenous ribonucleic acid, deoxyribonucleic acid or polyase. The action of the polyase-orthophosphate system is general for all ribonucleic acid, regardless of the source so long as it has not been degraded to a form not attacked by this system.

In order to more completely illustrate the inventive process the following specific example is given:

Ten grams of acetone-dried cells of *Micrococcus lysodeikticus* were suspended in 200 ml. of 0.5% sodium chloride solution. There were added 20 ml. of a 1.0 molar solution of $Na_2HPO_4$ and 10 ml. of 0.5 molar tris-hydroxymethylaminomethane (buffer), final pH 8.5. Two hundred mg. of crystalline lysozyme were added and the mixture incubated for 30 minutes at 37° C.

Following the incubation period 230 ml. of a 20% sodium chloride solution was added, and the solutions mixed thoroughly and heated rapidly to 95° C. for 30 minutes.

The mixture was cooled to room temperature and centrifuged at 5° C. for 30 minutes at 28,000 g. The supernatant from the centrifugation was mixed with 1 volume of 95% ethanol. The fibrous precipitate which formed was removed and dissolved in 100 ml. of 10% NaCl. The solution was then shaken with four volumes of chloroform for 30 minutes on a mechanical shaker, the chloroform layer removed and the emulsion of denatured protein and deoxyribonucleic acid centrifuged at 10,000 g. for ten minutes. The supernatant containing the deoxyribonucleic acid was removed and shaken again with 4 volumes of chloroform, centrifuged as above. This process was repeated for a minimum of three times or until no further gel interface of protein was formed. The supernatant was mixed with approximately an equal volume of 95° ethanol and the precipitated fibrous deoxyribonucleic acid removed, dissolved in 50 ml. of 2% NaCl, reprecipitated with 50 ml. ethanol, redissolved in 2% NaCl as before, this cycle repeated 3 times. The final precipitate containing the purified deoxyribonucleic acid was washed with 95% ethanol, acetone, ether, and dried in vacuo.

In Table I below are set out data for two preparations (Examples 4 and 5) carried out in accordance with the process of the instant invention. For comparison the effects of varying lengths of lysis time in the absence of orthophosphate are given (Examples 1, 2 and 3). The results of a low temperature extraction after incubation at 37° are also given (Example 6).

*Table I*

| Example | 1 | 2 | 3 | 4 | 5 | 6 |
| --- | --- | --- | --- | --- | --- | --- |
| Lysis time (in hr.) | 1.0 | 0.5 | 5.0 | 0.5 | 0.5 | 0.5 |
| Orthophosphate | | | | + | + | + |
| Temperature of extn., degrees | 95 | 95 | 95 | 95 | 95 | −5 |
| Yield (gm.) (percent) | 1.85 | 1.85 | 0.45 | 0.78 | 0.82 | 0.49 |
| N/P | 3.9 | 3.83 | 4.02 | 3.66 | 3.95 | 3.84 |
| $\epsilon_D(260\,m\mu)$ | 8,600 | 8,550 | 6,970 | 7,420 | 7,400 | 7,430 |
| $\frac{\epsilon_D(260\,m\mu)}{\epsilon_D(230\,m\mu)}$ | 3.0 | 2.56 | 1.96 | 2.05 | 1.81 | 3.26 |
| $\frac{\epsilon_D(260\,m\mu)}{\epsilon_D(290\,m\mu)}$ | 4.63 | 2.65 | 3.36 | 3.60 | 3.60 | 4.53 |
| $\eta_{c=0}$ | | | | 234 | 175 | 180 |
| RNA (percent) | 69 | 80 | 9 | 0.57 | 3.0 | 12.0 |
| DNA (percent) | 31 | 20 | 91 | 98.7 | 97.0 | 87.0 |
| Orthophosphate (percent) | | | | 0.65 | 0 | 1.0 |

The following points should be noted in the table:

(1) Examples 1 and 2 illustrate the essential requirement of orthophosphate for removal of ribonucleic acid and deoxyribonucleic acid.

(2) Examples 2 and 3 illustrate the destructive effect of prolonged lysis on the yield of deoxyribonucleic acid.

(3) Example 3 illustrates the possible separation of ribonucleic acid from deoxyribonucleic acid without added orthophosphate following prolonged incubation of the mixture, but the potential advantages of this are destroyed by (a) the poor yields of deoxyribonucleic acid and (b) the very poor quality of deoxyribonucleic acid as evidenced by its failure to precipitate as a fibrous precipitate in ethanol and the absence of any significant viscosity of concentrated solutions of this material.

(4) Example 6 illustrates the desirability of including a heating step in the extraction procedure, although fractionation of the material with acetone alone will remove a substantial portion of the residual ribonucleic acid not removed with ethanol.

(5) Examples 4, 5, and 6 illustrate the highly polymerized state of the deoxyribonucleic acid preparations as evidenced by their intrinsic viscosities, $\eta_{c=0}$. The probable molecular weights of these preparations are in the vicinity of ten million.

(6) The degree of purity of deoxyribonucleic acid according to the various methods of isolation and purification are indicated by the absorption spectra data, the nitrogen/phosphorus ratios and the intrinsic viscosities.

As was stated above the pH of the phosphorylysis step has a bearing on the rate and extent to which ribonucleic acid is phosphorylysed and rendered susceptible to removal by fractionation procedures. This is illustrated in Table II. Cells were lysed as above in the absence of orthophosphate and when lysis was judged to be complete (approximately 15 minutes), the mixture was centrifuged for 30 minutes at 28,000 g. The supernatant contained substantial quantities of ribonucleic acid and polyase. The rate of phosphorylysis of the ribonucleic acid was determined at varying pH in the presence of 0.1 M. $Na_2HPO_4$, 0.4 M. KCl, 0.1 M. trishydroxymethylaminomethane buffer, 0.0061 M. $MgCl_2$, at 37°.

*Table II*

| pH | Relative rates of phosphorylysis |
| --- | --- |
| 7.0 | 6.75 |
| 7.5 | 11.0 |
| 8.0 | 12.7 |
| 8.5 | 14.5 |
| 9.0 | 9.75 |
| 9.5 | 6.75 |

It will be seen that the preferred pH for ribonucleic acid destruction is at 8.5 although an operable range is between 7.5 and 9.0, a pH of 8.3 to 8.7 is preferred. KCl and $MgCl_2$ were added in this experiment because of their activating effect on the enzyme. They are not necessary in the phosphorylysis process using whole lysed cells.

The optimum concentration of orthophosphate was determined in a similar experiment. The reaction was carried out in 0.2 M. KCl, 0.002 M. $MgCl_2$, 0.1 M. trishydroxymethylaminomethane, pH 8.5, with a cell extract as prepared in Table II plus 0.2% of a crude nucleic acid preparation obtained from the cells.

*Table III*

| Concn. of $Na_2HPO_3$ added | Relative rate of phosphorylysis |
| --- | --- |
| 0.000 | 1.30 |
| 0.0017 M | 1.55 |
| 0.0033 | 1.97 |
| 0.0083 | 2.80 |
| 0.017 | 3.76 |
| 0.033 | 2.90 |
| 0.083 | 2.50 |

It will be seen that the preferred concentration of orthophosphate in this experiment is approximately 0.02 M. However, in view of the large quantity of ribonucleic acid present in the whole cells, it has been judged desirable to increase the concentration to 0.1 M. Also to be noted is the fact that phosphorylysis will take place in the absence of orthophosphate. This reflects the fact that the cells contain a substantial amount of orthophosphate which can act to degrade the ribonucleic acid given sufficient time, as illustrated by Example 3 of Table I. Thus the degree of purity and quality of deoxyribonucleic acid depends upon the concentration of orthophosphate and the time of phosphorylysis. Table IV contains data of this nature. The procedures of lysis, extraction and purification are the same as in Table I but with smaller quantities of material.

*Table IV*

| Time Allowed for Phosphorylysis, min. | Phosphate Concn. | Percent Yield | | Percent Contamination DNA by RNA |
| --- | --- | --- | --- | --- |
| | | DNA | RNA | |
| 30 | 0 | 0.42 | 0.39 | 49 |
| 60 | 0 | 0.41 | 0.49 | 55 |
| 120 | 0 | 0.47 | 0.23 | 33 |
| 30 | 0.01 M. | 0.49 | 0.48 | 50 |
| 60 | 0.01 | 0.47 | 0.45 | 50 |
| 120 | 0.01 | 0.57 | 0.61 | 51 |
| 30 | 0.05 | 0.21 | 0.21 | 50 |
| 60 | 0.05 | 0.30 | 0.12 | 28 |
| 120 | 0.05 | 0.60 | 0.12 | 17 |
| 30 | 0.10 M. | 0.084 | 0.038 | 32 |
| 60 | 0.10 | 0.098 | 0.008 | 10 |
| 120 | 0.10 | 0.515 | 0.033 | 5 |

To be noted in Table IV is the effect of time and phosphate concentrations on the percent contamination of deoxyribonucleic acid by ribonucleic acid. Of less importance are the actual yields which because of the small material used were usually small as a result of mechanical losses.

The practical application of ethanol in the fraction of deoxyribonucleic acid has been demonstrated in Table I. Two requirements must be met by the precipitating solvent to bring about a satisfactory separation of deoxyribonucleic acid from degraded ribonucleic acid. The deoxyribonucleic acid must precipitate out as a fibrous mass; the ribonucleic acid fragments must either remain soluble or precipitate out as a flocculent mass which can easily be separated from the fibrous and loosely woven deoxyribonucleic acid. In addition to alcohol, acetone meets this requirement. Methanol, dioxane, and monomethyl ether do not.

In the following Table V acetone separation of ribonucleic acid from deoxyribonucleic acid in a preparation of mixed ribonucleic acid and deoxyribonucleic acid obtained without the addition of orthophosphate during the incubation step at 37° is illustrated. The mixture was treated in the same manner as in the examples given in Table I. Following the last ethanol precipitation aliquots of the preparation of which 36% was ribonucleic acid were dissolved in 10 ml. of water, 1, 2, 4, and 8% NaCl. A predetermined amount of acetone was added to each sample (that amount which will produce the fibrous precipitate of deoxyribonucleic acid). The fibrous precipitate was redissolved in 10 ml. of fresh solution and reprecipitated as before with acetone. This process was repeated for a total of three times. The results of the fractionation are as follows:

Table V

| Percent NaCl | Vol. of Acetone Added | Rel. Yield of DNA | Percent Contamination of DNA by RNA |
| --- | --- | --- | --- |
| None | 20 | 20 | None detectable. |
| 1.0 | 7.6 | 50 | 2. |
| 2.0 | 6.1 | 88 | 4. |
| 4.0 | 4.6 | 100 | 7. |
| 8.0 | 4.0 | 55 | 16. |

As shown by these data the separation of ribonucleic acid from deoxyribonucleic acid with acetone was excellent at low salt concentrations. The low yields at low and high salt concentrations result from the poor recoveries from the solutions; the deoxyribonucleic acid does not form a firm fibrous mat. The optimum concentrations of salt for the final purification stages is recommended at 2%. Lower salt concentrations result in progressive and extensive damage to the structure of deoxyribonucleic acid.

Although acetone has apparently successfully fractionated deoxyribonucleic acid from ribonucleic acid without extensive phosphorylysis of ribonucleic acid the procedure is not recommended without the phosphorylysis step because the general quality and quantity of deoxyribonucleic acid obtained is very poor and similar to the material illustrated in Example 3 of Table I. However, in conjunction with the phosphorylysis step acetone fractionation is the method of choice.

The concentration of sodium chloride used during lysis and phosphorylysis is set at 0.5% because it has been found that this concentration of salt results in maximum rates of lysis by lysozyme. The use of trishydroxymethyl-aminomethane is not necessary. The proper pH may be obtained with the addition of suitable amounts of 1.0 N NaOH or KOH. The concentration of sodium chloride (potassium chloride may be used) used in the heating extraction step is that required to prevent the destruction of the deoxyribonucleic acid by heat. Extraction with water results in complete degradation of the deoxyribonucleic acid such that no fibrous material can be recovered. The established practice in this field has been to use a 10% solution but the limits may be as low as 2% and as high as 15%.

To reiterate briefly, the instant invention relates to an improved process for the separation of deoxyribonucleic acid from mixtures of deoxyribonucleic acid and ribonucleic acid and particularly to the preparation of deoxyribonucleic acid from the mixture of deoxyribonucleic acid and ribonucleic acid obtained from lysing *Micrococcus lysodeikticus* cells. The process of the invention comprises the steps of selective destruction of ribonucleic acid in the presence of orthophosphate ions and separation of the deoxyribonucleic acid from the mixture.

What is claimed is:

1. A process for preparing deoxyribonucleic acid which comprises the steps of lysing cells of *Micrococcus lysodeikticus* in the presence of lysozyme and orthophosphate ions at a pH within the range of 8.3 to 8.7, incubating the mixture at a temperature of from 30 to 40° for from 30 to 60 minutes, adding to the heated mixture sodium chloride and water, raising the temperature to one within the range of from 85 to 95° C. and maintaining that temperature for from 20 to 30 minutes, separating the residue from the mixture at room temperature, precipitating the deoxyribonucleic acid from the solution obtained with a material selected from the group of ethanol and acetone, and purifying the deoxyribonucleic acid thus obtained.

2. A process for preparing deoxyribonucleic acid from the mixture of deoxyribonucleic acid and ribonucleic acid present in *Micrococcus lysodeikticus* cells which comprises the steps of suspending *Micrococcus lysodeikticus* cells in a solution of sodium chloride, adding to said suspension crystalline lysozyme and a salt of orthophosphoric acid, adjusting the pH of the mixture to one within the range of from 8.3 to 8.7, incubating said mixture at about 37° C. for about 30 minutes, adding to said incubating mixture a solution of sodium chloride and water sufficient to increase the volume thereof and reduce the viscosity of the mixture, heating the resulting mixture to a temperature of about 90° C. for from 30 to 60 minutes, cooling the heated mixture to room temperature, separating the solids from the cooled mixture, adding to the separated liquid 95% acetone to precipitate the deoxyribonucleic acid in the sodium chloride solution, redissolving the deoxyribonucleic acid in a salt solution, treating said solution with chloroform to remove undesirable constituents, precipitating the purified deoxyribonucleic acid from said chloroform treated solution with acetone, redissolving the precipitated deoxyribonucleic acid in 2% sodium chloride, reprecipitating the deoxyribonucleic acid with acetone, repeating cycle until deoxyribonucleic acid is freed of contaminating orthophosphate ions and ribonucleic acid fragments, precipitating the final product with acetone and drying in ethanols, acetone and ether and in vacuo.

References Cited in the file of this patent

Palmade et al.: Compt. rend., 242, June 11, 1956, pp. 2870–2872.

Beers: Nature, 178, September 15, 1956, pp. 595–596.